United States Patent Office 3,141,758
Patented July 21, 1964

3,141,758
METHOD OF INHIBITING THE GERMINATION OF GRASS SEEDS
Philip C. Hamm, Webster Groves, and Angelo John Speziale, Creve Coeur, Mo., assignors to Monsanto Company, a corporation of Delaware
No Drawing. Filed July 7, 1961, Ser. No. 122,427
6 Claims. (Cl. 71—2.6)

This invention relates to new herbicidal compositions and methods for their use. Although the compositions can be used both in contact applications and in pre-emergence procedures, the latter is more significant, since it enables a selective activity on grasses without injuring the broad-leaf crop plants.

Many chemical compounds are known to be deleterious to the growth of vegetation and to have herbicidal effects under certain specific conditions; some of these are known to be quite effective at low levels of application. It is, however, a more difficult problem to provide useful herbicides for selective activity on undesirable plants, but which are harmless to other vegetation. Compounds of this type are known, being primarily useful in eliminating broad-leaf plants from grasses or grass-like cereal corps. This herbicidal activity is frequently related to the leaf area exposed to the herbicide, the plants with larger leaf areas being more susceptible to the contact herbicides.

In copending applications of earlier date the present applicants have shown that certain alpha-halo-acetamides are excellent herbicides, particularly with respect to grasses. It has also been shown that many near homologues are inactive and that the active compounds have critical molecular configurations which are necessary to produce the desired herbicidal effect. It has been demonstrated that the mono-halo acetyl radical is an essential radical, but not all compounds containing the radical are useful herbicides. For example, the mono-halo-acetamide is inactive, but can be converted to an active herbicidal compound by properly substituting on the nitrogen atom. The number and kind of substituents to produce active herbicides have no relgular pattern and the classes of compounds which have high degrees of activity are unpredictible and no theory of the herbicidal mechanism has yet been suggested. A few general observations have been made with respect to the limitations in structure and these provide the basis for separate patenability in several copending applications.

The primary purpose of this invention is to provide a new and useful class of herbicides having both contact and pre-emergence herbicidal properties. A further purpose of the invention is to provide selective herbicides capable of destroying grasses in the presence of broad-leaf crop plants. A still further purpose of the invention is to provide new chemical compounds having unusual utilities as are hereinafter described more fully.

Although previous study of the alpha-halo-acetamide herbicides has indicated that only one cyclic radical can be substituted on the amide nitrogen and this must be no more than one carbon atom removed from the nitrogen, it has now been shown that the presence of an oxygen or a sulfur atom (chalkogens) adjacent the cyclic radical and between the said cyclic radical and the amide nitrogen atom induces a substantial modification of the herbicidal properties. With the oxygen or sulfur atom adjacent the ring in one substituent on the amide nitrogen the other substituent on the amide nitrogen should usually be hydrogen or a linear aliphatic structure. However if there are two radicals having chalkogen atoms adjacent rings then the chalkogen atoms must be separated from the amide nitrogen by at least three atoms.

The new compounds useful in the practice of the novel procedures have the structural formula

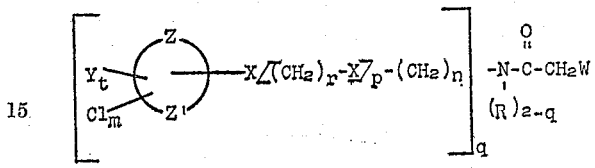

wherein Z—Z' is a hydrocarbon ring of the group consisting of benzene, cycloalkene having from four to eight carbon atoms and cycloalkane of from four to eight carbon atoms; wherein X is a chalkogen of the group consisting of oxygen and sulfur; wherein R is a radical of the group consisting of hydrogen, aliphatic hydrocarbon radicals of up to six carbon atoms, the oxa-aliphatic hydrocarbon radicals having up to six carbons atoms, and the said hydrocarbon and oxahydrocarbon radicals containing chlorine substituents; wherein Y is an alkyl radical of up to four carbon atoms; wherein W is selected from the group consisting of chlorine and bromine; wherein $n$ is an integer from one to four; wherein $m$ is an integer from zero to three; wherein $t$ is an integer from zero to three; wherein $q$ is an integer from one to two; wherein $p$ is an integer from zero to three; wherein $r$ is an integer from one to four; and wherein when $q$ is two and $p$ is zero $n$ must be at least three.

The new compounds are prepared by contacting a haloacetyl chloride, such as bromoacetyl chloride or chloroacetyl chloride, with an amine having one or two of the desired substituents in the presence of an alkali metal hydroxide. The reagents are gradually combined so as to provide a controlled reaction rate, using a cooling medium if required. Further details of the preparation will be hereinafter described in specific examples.

Several distinct types of the new class of compounds are recognizable, for example

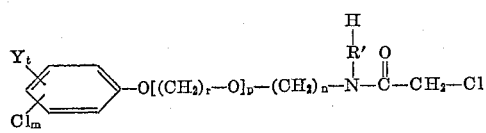

wherein Y, $n$, $m$, $s$, $t$ and $p$ are as above defined and R' is an aliphatic divalent hydrocarbon radical of up to six carbon atoms.

Representative compounds include:
Alpha-chloro-N-2,4-dichlorophenoxyethyl acetamide
Alpha-chloro-N-phenoxymethyl acetamide
Alpha-chloro-N-allyl-N-phenoxypropyl acetamide
Alpha-chloro-N-(2-methyl-4-chlorophenoxy)methyl acetamide
Alpha-chloro-N-ethyl-N-phenoxyethyl acetamide Another type may be represented by the structure

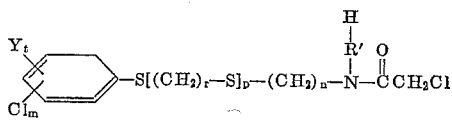

wherein the several symbols are as above defined. This type includes the compounds:

Alpha-chloro-N-phenylthiopropyl acetamide
Alpha-chloro-N-ethyl-N-phenylthioethoxyethyl acetamide
Alpha-chloro-N-phenylthiomethyl acetamide
Alpha-chloro-N-allyl-N-phenylthiopropyl acetamide
Alpha-chloro-N-n-propyl-N-phenylthiomethyl acetamide Another group of compounds embraced by the generic formula are those of the structure

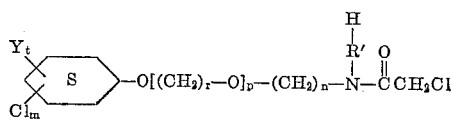

the symbols of which are as above identified.
Representative compounds include:

Alpha-chloro-N-4-chlorocyclohexyloxypropyl acetamide
Alpha-chloro-N-allyl-N-cyclohexyloxyethyl acetamide
Alpha-chloro-N-cyclohexyloxypropyl acetamide
Alpha-chloro-N-4-isopropylcyclohexyloxyethyl acetamide
Alpha-chloro-N-ethyl-N-cyclohexyloxymethyl acetamide A still further type of compound in the generic scope is evident

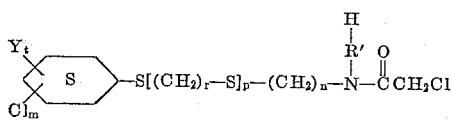

the symbols of which are above identified.
Representative compounds include:

Alpha-chloro-N-cyclohexylthiopropyl acetamide
Alpha-chloro-N-allyl-N-cyclohexylthiomethyl acetamide
Alpha-chloro-N-ethyl-N-cyclohexylthioethyl acetamide
Alpha-chloro-N-4-methylcyclohexylthiopropyl acetamide
Alpha-chloro-N-cyclohexylthioethyl acetamide The above four subgeneric classes include many of the more readily available compounds but they do not include all of the useful compounds embraced by the generic claim. Compounds with valuable properties which are excluded from the above subgeneric formula are:

Alpha-bromo-N-phenoxyethyl acetamide
Alpha-chloro-N,N-di(3-cyclohexyloxypropyl) acetamide
Alpha - chloro - N-methoxypropyl-N-phenoxyethyl acetamide
Alpha-chloro-N-methoxyethyl-N-phenoxyethyl acetamide
Alpha-bromo-N-cyclohexylthioethyl acetamide
Alpha - chloro-N - 3-phenoxypropyl-N-3-cyclohexylthiopropyl acetamide Further details of the preparation of the compounds are set forth in the following specific examples:

*Example I*

A suitable reaction flask is charged with 100 cc. of chloroform and 15.9 g. of 3-phenoxypropyl 2-methoxyethyl amine and 17.5 g. of 20% sodium hydroxide. The reaction vessel is then cooled to −10 to −20° C. and over a half hour period 9.7 g. of chloroacetyl chloride is added thereto. After standing for three hours the organic liquid is separated from the aqueous liquid and the chloroform evaporated from the organic layer. The resulting product is distilled in a vacuum and is found to have an index of refraction of $n_D^{25}$ 1.5261. The compound thereby formed is alpha-chloro-N-3-phenoxypropyl-N-2-methoxyethyl acetamide.

*Example II*

The reaction vessel was charged with 20 g. of 20% sodium hydroxide 100 ml. of chloroform and 15.9 g. of 3-phenoxypropyl ethyl amine. 11.3 g. of chloroacetyl chloride were gradually introduced into the reaction vessel at a controllable rate. After the reaction had been completed the product was separated by distillation at 0.45 ml. total pressure and at a temperature of 158–160° C. The index of refraction $n_D^{25}$ was 1.5325. The compound thereby formed is alpha-chloro-N-3-phenoxypropyl-N-ethyl acetamide.

*Example III*

Using the procedure of Example I, except substituting cyclohexyloxypropyl amine for the phenoxy propyl methoxyethyl amine the resulting product is identified as alpha-chloro-N-cyclohexyloxypropyl acetamide.

*Example IV*

The procedure of Examples I and II was repeated except N-(phenoxyethoxypropyl) amine was used in the reaction. The resulting product is alpha-chloro-N-phenoxyethoxypropyl acetamide.

*Example V*

By methods analogous to the above all of the alpha-chloro acetamides with structures defined in the following table were prepared, all of which had remarkable herbicidal activity as demonstrated in the same table.

Relative value of the claimed compounds was determined by planting greenhouse flats with seeds of numerous different plants each representing a principal botanical type as follows:

| | |
|---|---|
| A | Wild oat. |
| B | Brome grass. |
| C | Rye grass. |
| D | Foxtail. |
| E | Barnyard grass. |
| F | Crabgrass. |
| G | Pigweed. |
| H | Buckwheat. |
| I | Mustard (radish). |
| J | Beet, sugar. |
| K | Cotton. |
| L | Corn. |
| M | Field bindweed. |
| N | Morning glory (wild). |

The following table of numerals will be used to designate the relative pre-emergence herbicidal effect of the various haloacetamides:

| | |
|---|---|
| 0 | No phytotoxity. |
| 1 | Slight phytotoxity. |
| 2 | Moderate phytotoxity. |
| 3 | Severe phytotoxity. |

| | Rate | A | B | C | D | E | F | G | H | I | J | K | L | M | N | O | P | Q | R | S |
|---|---|---|---|---|---|---|---|---|---|---|---|---|---|---|---|---|---|---|---|---|
| Alpha-chloro-N-phenylthiopropyl acetamide | 25 | 3 | 3 | 3 | 3 | 3 | 3 | 3 | 0 | 1 | 2 | 1 | 0 | 1 | 0 | ---- | ---- | ---- | ---- | ---- |
| | 10 | 3 | 3 | 2 | 3 | ---- | 3 | 3 | 0 | 1 | 0 | 0 | 0 | 0 | 0 | ---- | ---- | ---- | ---- | ---- |
| | 1 | 2 | 1 | 2 | 3 | ---- | 3 | 0 | 0 | 0 | 0 | 0 | 0 | 0 | 1 | ---- | ---- | ---- | ---- | ---- |
| Alpha-chloro-N-phenoxyethyl acetamide | 25 | 3 | 3 | 3 | 3 | 3 | 3 | 3 | 0 | 1 | 2 | 0 | 0 | 0 | 0 | ---- | ---- | ---- | ---- | ---- |
| | 10 | 1 | 3 | 1 | 3 | 3 | 3 | 3 | 1 | 0 | 3 | 0 | 0 | 0 | 0 | ---- | ---- | ---- | ---- | ---- |
| | 5 | 1 | 3 | 2 | 3 | 3 | 3 | 3 | 0 | 0 | 0 | 0 | 0 | 0 | 0 | ---- | ---- | ---- | ---- | ---- |
| | 1 | 1 | 0 | 0 | 3 | 3 | 3 | 3 | 2 | 0 | 1 | 0 | 3 | 1 | 2 | ---- | ---- | ---- | ---- | ---- |
| Alpha-chloro-N-cyclohexyloxypropyl acetamide | 25 | 3 | 3 | 3 | 3 | 3 | 3 | 3 | 1 | 0 | 0 | 0 | 0 | 3 | 0 | ---- | ---- | ---- | ---- | ---- |
| | 10 | 3 | 3 | 3 | 3 | 3 | 3 | 3 | 1 | 0 | 0 | 1 | 3 | 1 | 0 | ---- | ---- | ---- | ---- | ---- |
| | 5 | 3 | 3 | 3 | 3 | 3 | 3 | 3 | 0 | 0 | 0 | 0 | 0 | 0 | 0 | ---- | ---- | ---- | ---- | ---- |
| | 1 | 1 | 3 | 1 | 2 | 3 | 3 | 0 | 0 | 0 | 0 | 0 | 0 | 0 | 0 | ---- | ---- | ---- | ---- | ---- |
| | ½ | 2 | 3 | 1 | 1 | 1 | 0 | 0 | 0 | 0 | 0 | 0 | 0 | 0 | 0 | ---- | ---- | ---- | ---- | ---- |
| Alpha-chloro-N-phenoxypropyl-N-methoxy ethyl acetamide | 25 | 3 | 3 | 3 | 3 | 3 | 3 | 3 | 0 | 0 | 0 | 0 | 0 | 0 | 0 | ---- | ---- | ---- | ---- | ---- |
| | 5 | 2 | 3 | 3 | 3 | 0 | 3 | 3 | 1 | 0 | 0 | 0 | 0 | 0 | 0 | ---- | ---- | ---- | ---- | ---- |
| | 1 | 1 | 0 | 1 | 0 | 2 | 3 | 0 | 0 | 0 | 0 | 0 | 0 | 0 | 0 | ---- | ---- | ---- | ---- | ---- |
| Alpha-chloro-N-ethyl-N-phenoxypropyl acetamide | 25 | 3 | 3 | 3 | 3 | 3 | 3 | 3 | 3 | 0 | 3 | 0 | 0 | 0 | 0 | ---- | ---- | ---- | ---- | ---- |
| | 5 | 3 | 3 | 3 | 3 | 3 | 3 | 3 | 2 | 0 | 2 | 0 | 0 | 0 | 0 | ---- | ---- | ---- | ---- | ---- |
| | 1 | 2 | 2 | 3 | 3 | 3 | 3 | 3 | 1 | 1 | 0 | 0 | 0 | 0 | 0 | ---- | ---- | ---- | ---- | ---- |
| | ½ | ---- | ---- | ---- | ---- | ---- | ---- | ---- | ---- | ---- | ---- | ---- | ---- | ---- | ---- | ---- | ---- | ---- | ---- | ---- |
| Alpha-chloro-N-phenoxyethoxypropyl acetamide | 25 | 3 | 3 | 3 | 3 | 3 | 3 | 3 | 0 | 2 | 3 | 3 | 1 | 2 | 0 | ---- | ---- | ---- | ---- | ---- |
| | 5 | 3 | 3 | 3 | 3 | 3 | 3 | 0 | 3 | 0 | 1 | 0 | 1 | 0 | 0 | ---- | ---- | ---- | ---- | ---- |
| | 1 | 1 | 1 | 0 | 2 | 2 | 2 | 0 | 1 | 0 | 0 | 1 | 0 | 3 | 1 | ---- | ---- | ---- | ---- | ---- |
| Alpha-chloro-N-phenoxypropyl acetamide | 25 | 3 | 3 | 3 | 3 | 3 | 3 | 3 | 1 | 1 | 3 | 0 | 1 | 1 | 2 | ---- | ---- | ---- | ---- | ---- |
| | 10 | 3 | 3 | 3 | 3 | 3 | 3 | 3 | 0 | 0 | 3 | 2 | 1 | 1 | 0 | ---- | ---- | ---- | ---- | ---- |
| | 5 | 3 | 3 | 3 | 3 | 3 | 3 | 3 | 0 | 2 | 2 | 0 | 0 | 0 | 1 | ---- | ---- | ---- | ---- | ---- |
| | 1 | 0 | 0 | 2 | 1 | 2 | 3 | 3 | 0 | ---- | 2 | 0 | 0 | 1 | 0 | ---- | ---- | ---- | ---- | ---- |
| Alpha-chloro-N,N-di(3-phenoxypropyl) acetamide | 25 | 2 | 3 | 2 | 3 | 3 | 3 | 0 | 3 | 1 | 3 | 0 | 0 | 1 | 0 | ---- | ---- | ---- | ---- | ---- |
| | 5 | 1 | 3 | 0 | 3 | 1 | 3 | 0 | 0 | 0 | 2 | 0 | 0 | 0 | 0 | ---- | ---- | ---- | ---- | ---- |
| | 1 | 0 | 2 | 1 | 3 | 0 | 0 | 0 | 1 | 2 | 2 | 2 | 0 | 2 | 2 | ---- | ---- | ---- | ---- | ---- |

In order to demonstrate the critical structure of the compounds used in the practice of this invention the following table shows the lack of herbicidal properties for homologous compounds not included within the scope of the claims.

| | Rate | A | B | C | D | E | F | G | H | I | J | K | L | M | N | O | P | Q | R | S |
|---|---|---|---|---|---|---|---|---|---|---|---|---|---|---|---|---|---|---|---|---|
| Alpha-chloro-N,N-diphenoxyethyl acetamide | 25 | 0 | 0 | 0 | 0 | 0 | 0 | 0 | ---- | 0 | 0 | 0 | 0 | 0 | 0 | ---- | ---- | ---- | ---- | 0 |
| | 5 | 0 | 0 | 0 | 0 | 0 | 0 | 0 | ---- | 0 | 0 | 0 | 0 | 0 | 0 | ---- | ---- | ---- | ---- | 0 |
| | 1 | 0 | 0 | 0 | 0 | 0 | 0 | 0 | ---- | 0 | 0 | 0 | 0 | 0 | 0 | ---- | ---- | ---- | ---- | 0 |
| Alpha-chloro-N-phenoxypropyl-N-phenyl acetamide | 25 | 0 | 0 | 0 | 0 | 0 | 0 | 0 | 0 | 0 | 0 | 0 | 0 | 0 | 0 | ---- | ---- | ---- | ---- | ---- |
| | 5 | 0 | 0 | 0 | 0 | 0 | 0 | 0 | 0 | 0 | 0 | 0 | 0 | 0 | 0 | ---- | ---- | ---- | ---- | ---- |
| | 1 | 0 | 0 | 0 | 0 | 0 | 0 | 0 | 0 | 0 | 0 | 0 | 0 | 0 | 0 | ---- | ---- | ---- | ---- | ---- |

Valuable herbicidal effects, especially with respect to grasses, will be observed from applications of small amounts, often as low as 0.1 pound per acre as well as at higher concentrations, for example 100 pounds per acre. The selective activity on grasses is more pronounced at lower levels of application, for example from one to 15 pounds per acre. At heavier levels of application, for example 10 to 50 pounds per acre, the selectivity is less pronounced and the general herbicidal effects are obtained.

To obtain the general herbicidal effects, application may be made by spraying the foliage of a growing plant. The selective activity is observed by pre-emergence application by spraying the compound or formulations thereof on the soil surface either prior to or subsequent to the planting of the seed. The preferred method is to plant the seed first and spray the surface with a formulation of the compound which will permeate the top soil layer and destroy the grasses by contact either prior to or subsequent to germination.

These herbicides are not usually applied in neat form, more efficient use being obtained by the use of formulations which include in addition to the alpha-chloro-acetamides various conditioning agents which enhance the activity or adapt it for use with conventional machinery for treating plant or soil surfaces.

The solid formulations, frequently referred to as "dusts," may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, Fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if they are mixed with the surface soil by means of a disk-plow or harrow at the time of application.

The liquid compositions for herbicidal use may be solutions or other liquid dispersions. The choice of a liquid medium will depend to some extent upon the physical properites of the active ingredient. The N-substituted alpha-haloacetamides may be water soluble and mere dissolution will then provide a usable formulation. Often the N-substituted alpha-haloacetamides are only limitedly soluble in water and therefore aqueous formulations will necessarily be dispersions of minute drops or solids particles of the water-insoluble substances in suspension in an aqueous medium. The known water-insoluble substituted alpha-haloacetamides of this invention may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with faty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

The concentrated formulations may be both liquid and solid and may contain from 50 to 98% of the active component. In the case of the completely water soluble herbicides higher percentages or even 100% may be used. However, in most cases a smaller amount of a surface active agent is desirable so that dilution in the field may be facilitated.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component, will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

In addition to the above described herbicide conditioning agents adjuvants may be added, such as insecticides, fungicides, nematocides and other herbicides. By the use of the subject compounds at the low grass specific levels of application, substantial benefits can be obtained by the addition thereto of a broad leaf specific herbicide, for example, 2,4-dichlorophenoxyacetic acid and the corresponding esters, amine salts and alkali metal salts, trichlorobenzoic acid and derivatives thereof, such as trichlorobenzyl chloride and trichloro-toluene. In this manner, formulations of efficient and effective use can be provided.

This application is a continuation-in-part of application, Serial No. 726,602, filed April 7, 1958, by Angelo J. Speziale and Philip C. Hamm, now abandoned.

The embodiments of the invention in which an exclusive property or privilege is claimed are defined as follows:

1. The method of selectively inhibiting the germination of grass seeds in contact with soil and the pre-emergent growth thereof, which comprises treating the said soil with a herbicidal amount of a compound of the structural formula

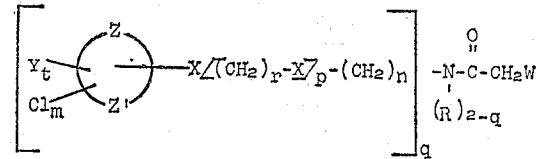

wherein Z—Z' is acyclic radial of the class consisting of phenyl and cyclohexyl; wherein Y is an alkyl radical of up to four carbon atoms and $t$ is an integar from zero to three; wherein $m$ is an integer from zero to three; wherein X is a chalkogen of the class consisting of oxygen and sulfur; wherein $r$ is an integer from one to three; wherein $p$ is an integer from zero to one; wherein $q$ is an integer from one to two; wherein the sum of $m$ and $t$ does not exceed five; wherein $n$ is an integer from one to four, provided that when $q$ is two, then $n$ is at least three; wherein W is a halogen selected from the class consisting of chlorine and bromine; and wherein R is selected from the class consisting of hydrogen, allyl and alkyl having up to three carbon atoms.

2. The method of selectively inhibiting the germination of grass seeds in contact with soil and the pre-emergent growth thereof, which comprises treating the said soil with a herbicidal amount of alpha-chloro-N-ethyl-N-phenoxypropyl acetamide.

3. The method of selectively inhibiting the germination of grass seeds in contact with soil and the pre-emergent growth thereof, which comprises treating the said soil with a herbicidal amount of alph-chloro-N-phenyl-thiopropyl acetamide.

4. The method of selectively inhibiting the germination of grass seeds in contact with soil and the pre-emergent growth thereof, which comprises treating the said soil with a herbicidal amount of alpha-chloro-N-cyclohexyloxypropyl acetamide.

5. The method of selectively inhibiting the germination of grass seeds in contact with soil and the pre-emergent growth thereof, which comprises treating the said soil with a herbicidal amount of alpha-chloro-N-3-phenoxypropyl acetamide.

6. The method of selectively inhibiting the germination of grass seeds in contact with soil and the pre-emergent growth thereof, which comprises treating the said soil with a herbicidal amount of alpha-chloro-N,N-di(3-phenoxypropyl) actamide.

References Cited in the file of this patent

UNITED STATES PATENTS

| 2,765,338 | Suter et al. | Oct. 2, 1956 |
| 2,773,899 | Martin et al. | Dec. 11, 1956 |

OTHER REFERENCES

Suter et al.: "J. Liebigs Annalen de Chemie," vol. 576 (1952), pages 223–231.

Hamm et al.: "Agr. and Food Chem," vol 4, No. 6, June 1956, pages 518–522.

Hamm et al.: "Agr. and Food Chem.," vol. 5, No. 1, January 1957, pages 30–32.